H. MICHAUX.
Mowing-Machines.
No. 143,025. Patented September 23, 1873.
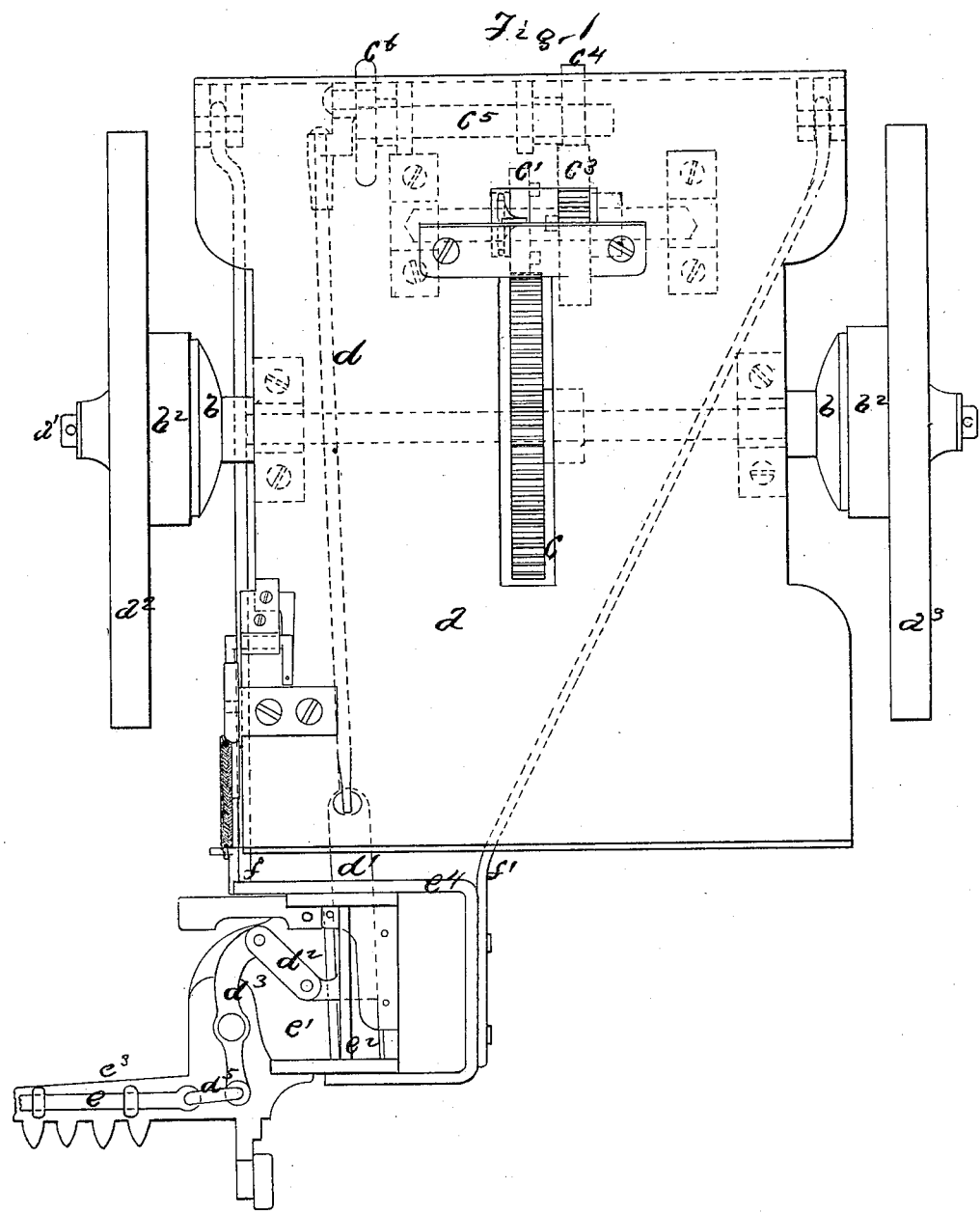

UNITED STATES PATENT OFFICE.

HIPPOLYTE MICHAUX, OF HIGGANUM, CONNECTICUT.

IMPROVEMENT IN MOWING-MACHINES.

Specification forming part of Letters Patent No. 143,025, dated September 23, 1873; application filed October 13, 1871.

*To all whom it may concern:*

Be it known that I, HIPPOLYTE MICHAUX, of Hartford, in the county of Hartford and State of Connecticut, have invented certain new and useful Improvements in Mowing-Machines, of which the following is a specification, reference being had to the accompanying drawings, in which—

Figure 1 is a top or plan view of the machine.

The invention consists in a new combination and arrangement for imparting vibratory motion to the cutter-bar.

The letter $a$ indicates the table of the machine hung on the main axle $a^1$, on the ends of which are the main wheels $a^2$ and $a^3$, attached to the axle by a ratchet-and-pawl arrangement, which causes the axle to rotate with the wheels when the machine is moved forward, but allows the axle to remain stationary, so far as rotary motion is concerned, when the machine is rolled backward. To this end the axle has two plates, $b$, rigidly attached thereto, on the outer face of which is the pawl engaging with the ratchet-teeth on the inner circumference of the ratchet-box $b^2$, which is attached to the inner side of each driving-wheel. The pawl is pressed against the ratchet by a spring. The main axle carries a gear, $c$, meshing into the clutch-pinion $c^1$, which is operated by a lever so that this clutch-pinion can be thrown in and out of gear. On the same shaft with the clutch-pinion is the gear $c^3$ meshing into the gear $c^4$, which is fast on the shaft $c^5$, on the end of which is the crank-disk $c^6$ carrying the pitman $d$, connected at its farther and forward end to the sliding and reciprocating bar $d^1$, to the side of which is jointed the link $d^2$, also jointed to the lever $d^3$, which lever is jointed by the link $d^5$ to the cutter-bar $e$. This arrangement gives reciprocating or vibratory motion to the cutter-bar when the machine is rolled ahead. The bar $d^1$, link $d^2$, lever $d^3$, and link $d^4$, are all set upon the swing-block $e^1$ which is pivoted on the rod $e^2$, so that it will turn up into a vertical position. The finger-bar $e^3$ is rigidly attached to the swing-block. The rod $e^2$ is hung in the frame $e^4$, which is attached to the ends of the two rods $f$ and $f^1$, which are pivoted at their rear ends to the under side of the table, so as to permit the frame $e^4$ and its adjuncts to be raised. Such raising is accomplished by means of a lever, from which a chain depends attached to the frame $e^4$. The pitman-rod $d$ and the pivot-rod $e$ are in the same line, so as to permit the turning of the swing-block.

I claim as my invention—

The combination of the swing-block $e^1$, bar $d^1$, link $d^2$, lever $d^3$, link $d^5$, cutter-bar $e$, and finger-bar $e^3$, the whole constructed, arranged, and designed for operation and use substantially as described.

HIPPOLYTE MICHAUX.

Witnesses:
W. E. SIMONDS,
GEORGE G. SELL.